No. 876,703. PATENTED JAN. 14, 1908.
F. H. DUKESMITH.
ENGINEER'S BRAKE VALVE.
APPLICATION FILED DEC. 28, 1905.
4 SHEETS—SHEET 4.
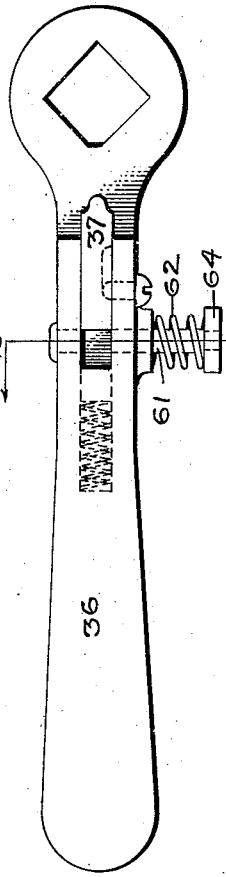
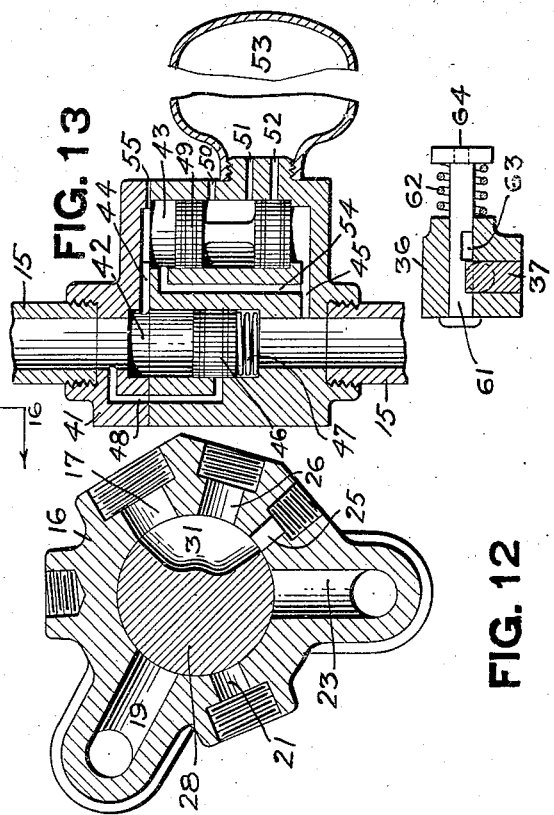
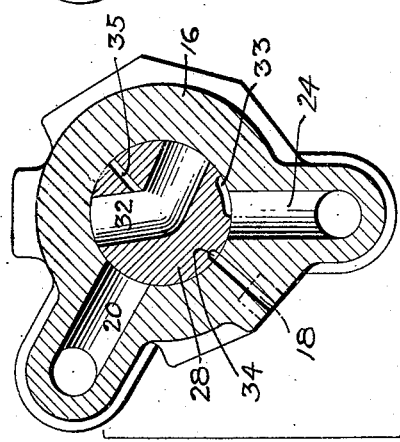
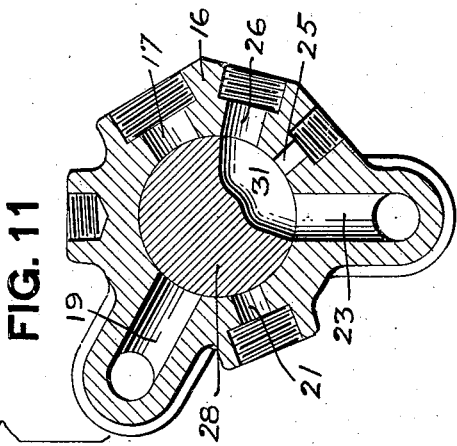
WITNESSES.
INVENTOR.
Frank H. Dukesmith,
By Kay, Totten & Writer
His Attys.

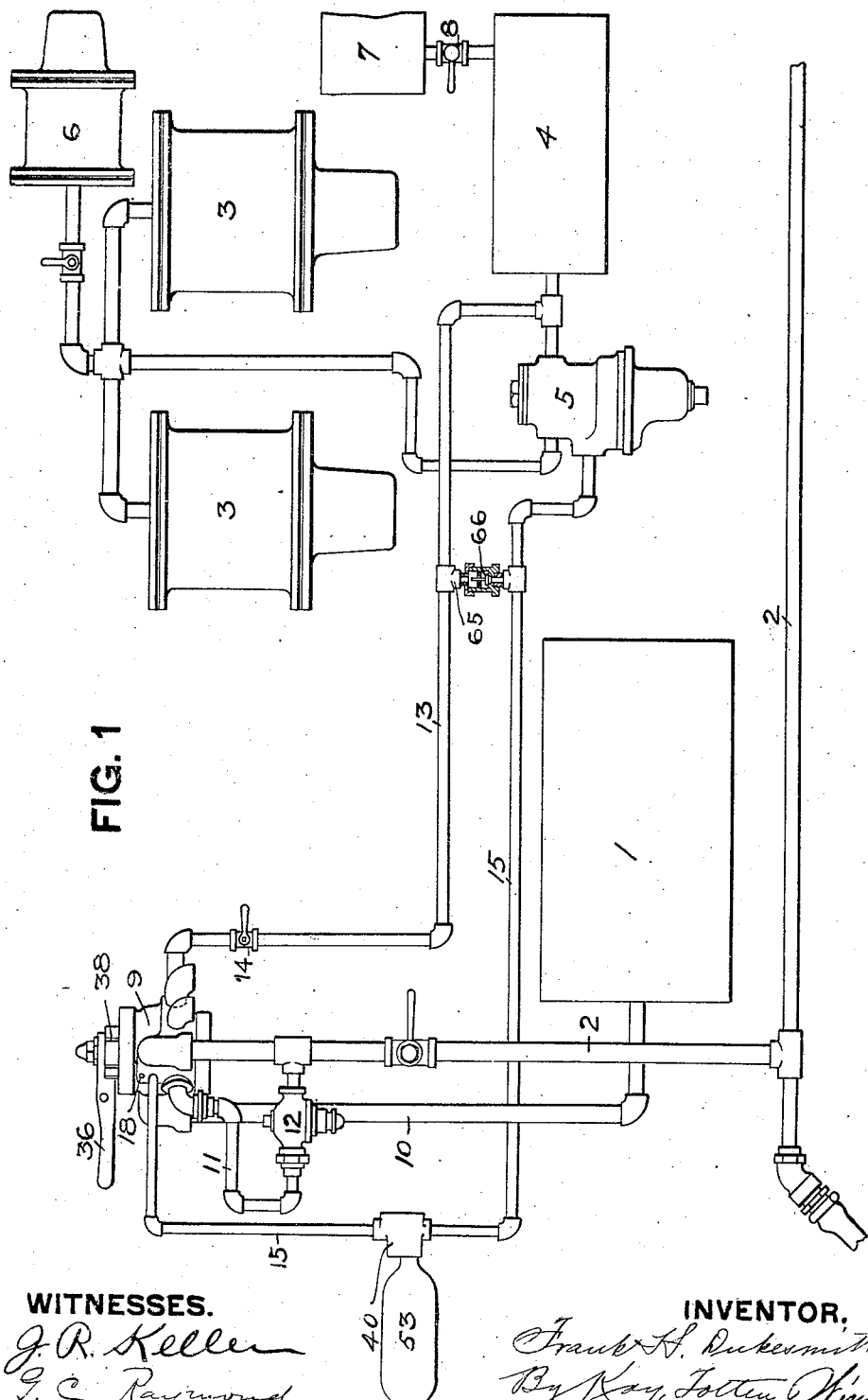

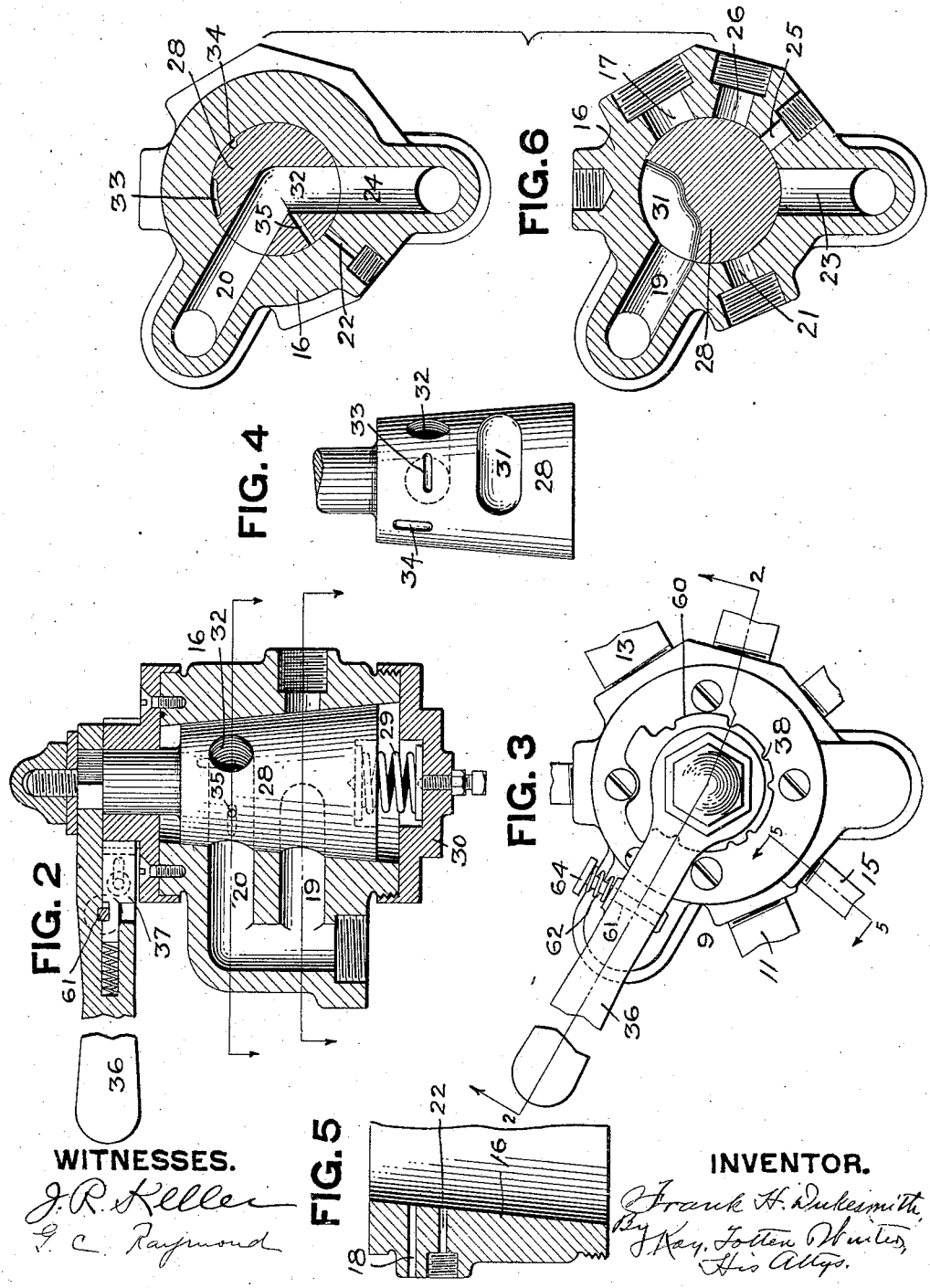

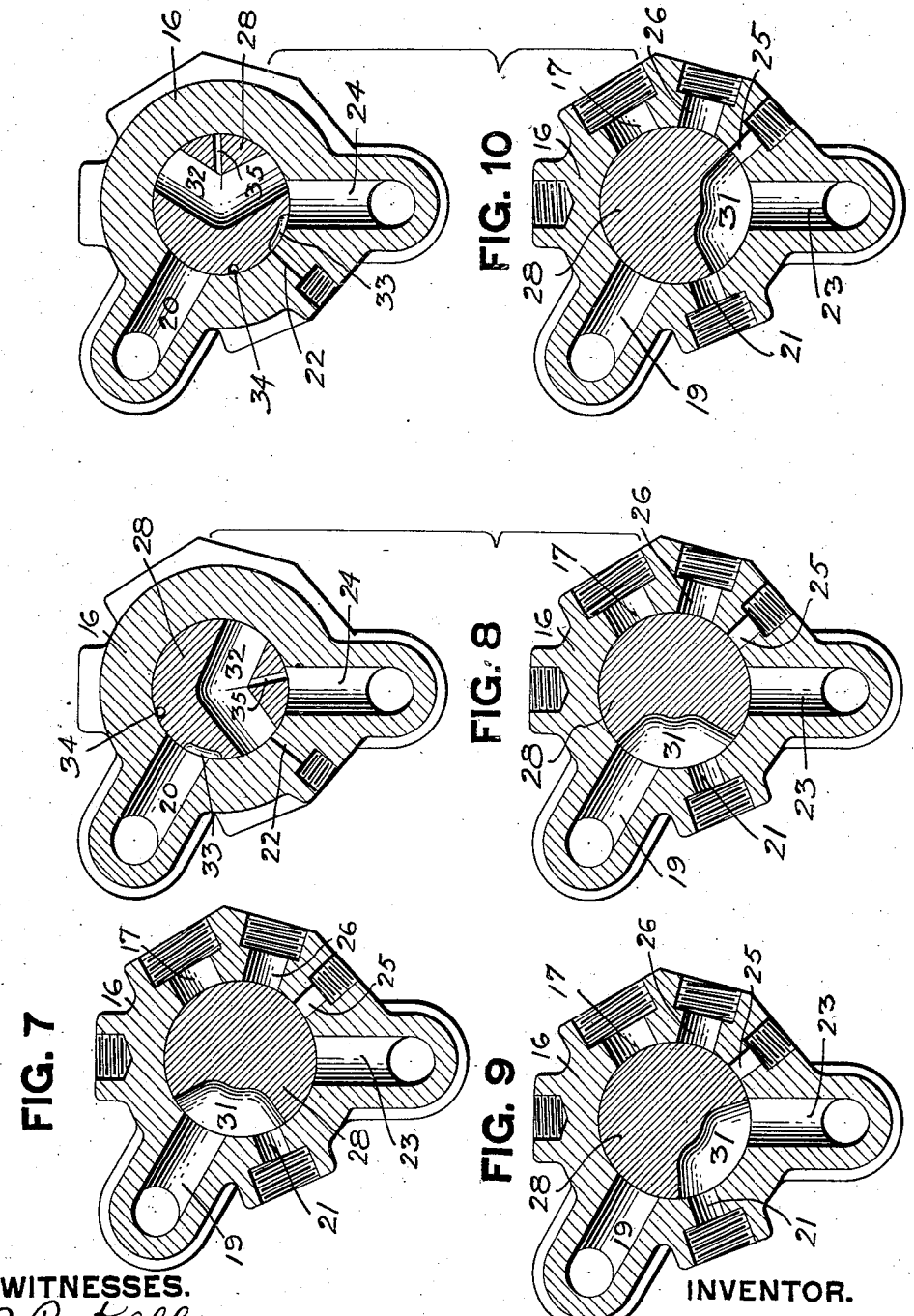

UNITED STATES PATENT OFFICE.

FRANK H. DUKESMITH, OF MEADVILLE, PENNSYLVANIA, ASSIGNOR TO THE DUKESMITH AIR BRAKE COMPANY, OF PITTSBURG, PENNSYLVANIA, A CORPORATION OF WEST VIRGINIA.

ENGINEER'S BRAKE-VALVE.

No. 876,703.  Specification of Letters Patent.  Patented Jan. 14, 1908.

Application filed December 28, 1905. Serial No. 293,639.

*To all whom it may concern:*

Be it known that I, FRANK H. DUKESMITH, a resident of Meadville, in the county of Crawford and State of Pennsylvania, have invented a new and useful Improvement in Engineer's Brake-Valve; and I do hereby declare the following to be a full, clear, and exact description thereof.

This invention relates to automatic air-brake systems, and its object, generally stated, is to provide an engineer's valve which is capable of performing all of the usual functions of the ordinary engineer's valve in use with existing air-brake systems, and which will also give the engineer control of his engine brakes independently of the train brakes, and by means of which the engineer can also quickly release his engine brakes by venting the air from the auxiliary reservoir, as may be necessary in case of a burst hose or other emergency; all of these operations and functions being secured by the manipulation of a single handle.

A further object of invention is to provide means for charging the engine auxiliary reservoir independently of the triple valve.

In all existing air-brake systems there is provided in the engine cab a valve, technically known as the engineer's brake valve, by means of which the engineer can apply the brakes either with service or emergency application, can release the brakes, and can hold the brakes of the entire train set. He cannot, however, by such a valve perform any other function.

Many conditions arise in the handling of trains wherein it is desirable that the engine brakes be controlled independently of the train brakes, as is well known by every practical railroad man. My improved valve mechanism, while performing all of the functions of the ordinary engineer's valve, also provides for giving this independent control of the engine brakes with relation to the train brakes. By means of it, it is possible to apply or release the engine brakes without applying the train brakes, or vice versa, and also after applying the brakes of the engine and train in the usual way, to release the train brakes while holding the engine brakes, or vice versa, so that while holding the engine brakes, the train pipe and auxiliary reservoirs on the cars can be recharged.

With all existing air-brake systems in case a hose or the train pipe bursts, the brakes are applied very severely, and as the holding power of the engine brakes is equivalent to that of from six to ten cars, the effect is that the train is held very firmly at its front end, while the cars bunch up on the engine and are caused to buckle, thus throwing them off the track and causing serious wrecks. Such wrecks might be avoided if it were possible for the engineer to quickly release the engine brakes so as to prevent the severe bunching of the cars against the engine.

In all existing air-brake systems, it is impossible to release the engine brakes with the engineer's valve in case the hose bursts. In some systems provisions have been made to release the engine brakes by means of separate valves connected to the engine and tender brake cylinders. With these valves, however, it is necessary for the auxiliary reservoir pressure to pass through the triple valve (since the latter is in full application position) and through the brake cylinder to the atmosphere. Since the ports in the triple valve are comparatively small, it requires from twenty to thirty seconds to drain the engine brake cylinders and auxiliary reservoir. This lapse of time is sufficient to cause the wreck.

Another important feature of my engineer's valve is a provision whereby the engine brakes can be quickly, almost instantaneously, released in case of a burst hose, this being effected by the manipulation of the single handle above referred to and by connecting the engine auxiliary reservoir directly to the atmosphere. Provision is made whereby this emergency release position of the valve can be obtained only by manipulation of a special lock on the valve handle, thus making it impossible to accidentally place the valve in this position.

To the accomplishment of the foregoing objects and functions, the invention consists in the arrangement of parts hereinafter described and claimed.

In the accompanying drawings, Figure 1 is a diagrammatic view of an air-brake system with my improvements applied thereto; Fig. 2 is a vertical sectional view through the engineer's valve on the line 2—2, Fig. 3; Fig. 3 is a plan view of the same; Fig. 4 is a side elevation of the plug or key; Fig. 5 is a sectional view of the case on the line 5—5, Fig. 3; Figs. 6 to 12 are horizontal sectional views of the valve in its various positions; Fig. 13 is a sectional view of the automatic exhaust valve; Fig. 14 is a bottom plan view of the valve handle; and Fig. 15 is a section thereof on the line 16—16, Fig. 14.

In the drawings the numeral 1 represents the main reservoir, 2 the train pipe, 3 the engine brake cylinder, 4 the engine auxiliary reservoir, and 5 the engine triple valve. All of these parts are or may be of the usual construction and connected in the ordinary way, except as to the connection of the triple valve to the system, as will be hereinafter explained.

The tender brake cylinder 6 is also connected to the triple valve 5, thus dispensing with the usual tender triple valve. To give sufficient capacity to auxiliary reservoir 4 to supply the tender brake cylinder in addition to the engine brake cylinders, I connect to the auxiliary reservoir 4 a supplemental auxiliary reservoir 7. A cut out cock 8 is placed in the connection between these reservoirs so that in case the tender brake cylinder is cut out, the supplemental reservoir 7 may also be cut out.

9 indicates my improved engineer's valve, which is connected to the train pipe 2, and to main reservoir by means of pipe 10. A pipe 11 also connects said valve to the train pipe, said pipe 11 having in it the usual reducing valve 12. My improved valve 9 is also connected to the auxiliary reservoir 4 by means of a pipe 13 in which is located a two way cock 14 by means of which the auxiliary reservoir 4 may be drained, thus also draining the brake cylinders 3, and releasing the engine brakes without disturbing the train pipe pressure or train brakes. A pipe 15 connects the engineer's valve with the triple valve 5, this being the supply or supplemental train pipe for said triple valve. It will be noticed that said triple valve has no direct connection with the train pipe 2.

My improved engineer's valve comprises a suitable casing 16 provided with a port 17 to which the auxiliary reservoir pipe 13 is connected, a port 18 leading to the atmosphere, ports 19 and 20 to which the main reservoir pipe 10 is connected, a port 21 to which the governor pipe 11 is connected, a port 22 to which the triple valve pipe 15 is connected, ports 23 and 24 to which the train pipe 2 is connected, a service exhaust port 25 and an emergency exhaust port 26. The ports 20, 22 and 24 are located in one horizontal plane in the casing, the port 18 in another plane, while the remaining ports are located in still another horizontal plane.

Rotatably mounted in the casing, is the plug valve 28 which is held against its seat by a graduated spring 29 bearing on the cap 30. This plug valve is provided with a groove or recess 31 which is in the plane of the majority of the ports in the casing. In the plane of the ports 20, 22 and 24, the plug is provided with the port 32, cored through said plug with two small grooves 33 and 34, one of which is vertical and the other horizontal, and with a small port 35 which intercepts the port 32.

The valve is provided with an operating handle 36 having a spring detent 37 coöperating with notches 38 formed in the cap of the valve or other suitable part, these notches determining the several positions of the valve.

The valve has seven different positions, as follows:

1. *Full release position* (Fig. 6): In this position the port 32 in the valve connects the main reservoir port 20 with the train pipe port 24 thus admitting main reservoir pressure directly to the train pipe for the purpose of releasing the brakes on the train, and charging the train auxiliary reservoirs. All other ports are blanked in this position of the valve.

2. *Holding position* (Fig. 7): In this position the groove 31 in the valve connects the main reservoir port 19 with the train pipe governor port 21, while connection between the main reservoir port 20 and train pipe port 24 is cut off. All other ports are blanked. As a consequence, the main reservoir pressure can reach train pipe only by passing through the reducing valve 12. In this position no pressure is admitted behind the piston of the triple valve 5 on the engine, and as a consequence, the engine brakes are held on while the train pipe and train auxiliaries are being charged.

3. *Running position* (Fig. 8): In this position the groove 31 still connects the main reservoir port 19 to the train pipe governor port 21. At the same time the train pipe port 24 is connected to the triple valve supply port 22 by means of the small port 35, near the top of the plug and entering the port 32. As a consequence, main reservoir pressure passing to the train pipe through the reducing valve, also flows through the pipe 15 to the triple valve 5 thus forcing this valve to release position and releasing the brakes on the engine.

4. *Lap position* (Fig. 9): In this position all of the ports in the valve are lapped, except ports 21 and 23, but as they both lead to the train pipe no effect is produced. As a consequence, there is no air passing from the main reservoir to either the train pipe or the triple valve supply pipe 15. The automatic exhaust valve in the supply pipe 15 will continue to be put into action in this position, as well as in the position shown in Fig. 7. This valve is constructed and acts as follows: The automatic exhaust valve 40 is in the pipe 15 and is shown in detail in Fig. 13. This exhaust valve comprises a suitable casing 41 having therein a chamber 42 communicating with the two sections of the pipe 15, and having at one side another chamber 43 which at its upper end communicates with the chamber 42 by means of a port 44 and at its lower end communicates with the pipe 15 by means of a port 45. In the chamber 42 is a piston valve 46 and interposed between the same and the bottom of the chamber is a spiral spring 47. A by-pass port 48 connects the chamber 42 near its bottom with the upper section of the supply pipe 15. In the chamber 43 is a double piston valve 49 which controls an exhaust port 50 leading to the atmosphere and ports 51 and 52 leading from the chamber 43 into the exhaust chamber 53. A by-pass port 54 connects the upper end of the chamber 43 with the lower section of the pipe 15. An exhaust or leak port 55 connects the upper end of the chamber 43 with the atmosphere. When pressure is admitted into the pipe 15 by means of the engineer's valve, when in running position, said pressure will force the piston 46 downwardly thus cutting off the by-pass 48 as shown in Fig. 13, and will then pass through the port 44 into chamber 43 also forcing the valve 49 downwardly. The pressure will pass through the by-pass port 54 into the lower section of the pipe 15 thus moving the triple valve 5 to release position and charging the auxiliary reservoir 4 in the usual way. In this position the valve 49 closes the port 52 and connects ports 50 and 51 thus exhausting chamber 53 to the atmosphere. When the engineer's valve is moved to either lap or holding position the supply of air to the pipe 15 is cut off and when the pressure on the opposite sides of the valve 46 has nearly equalized the spring 47 will raise the valve, thereby opening the by-pass 48 and closing the port 44. The air in the upper end of the chamber 43 will be quickly exhausted through port 55 thus permitting the pressure underneath the valve 49 to move the same upwardly, thereby cutting off the by-pass port 54 and the exhaust port 51 and opening the port 52. Consequently the pressure in the lower section of the pipe 15 will rush into the chamber 53. This chamber is of such capacity that when the air equalizes therein the pressure in the pipe 15 will have dropped sufficiently to move the triple valve 5 to service application position. In this manner the engine brakes will be applied. When this occurs the engineer's valve is in either lap or holding position and consequently will not secure an application of the train brakes, thus enabling the engineer to apply the engine brakes independently of the train brakes. By merely moving the engineer's valve to running position the valves 44 and 49 are again depressed, the pressure in the pipe 15 reëstablished, and the engine brakes released.

5. *Service application position* (Fig. 10): In this position the groove 31 in the valve connects the train pipe port 23 to the service exhaust port 25, and the groove 33 connects the port 22 of the pipe 15 to the train pipe port 24 and thence to exhaust port 25. This reduces pressures in both train pipe 2 and supply pipe 15 slowly and secures the ordinary service application of the brakes on both engine and train. In order to get a gradual reduction of train pipe pressure, the exhaust port 25 is preferably made V shaped.

6. *Emergency application position* (Fig. 11): In this position of the valve the train pipe port 23 is connected to both the service exhaust port 25 and the emergency exhaust port 26, while the triple valve supply pipe port 22 is connected to the atmosphere by means of the small groove 34 near the top of the plug with the exhaust port 18 thus securing an emergency application of the engine brakes as well as of the train brakes.

7. *Emergency release position* (Fig. 12): In this position of the valve the large groove 31 of the valve connects the auxiliary reservoir port 17 with the emergency exhaust port 26 and service exhaust port 25. As a consequence, the pressure in the engine auxiliary reservoir will rush to the atmosphere and the pressure in the engine brake cylinder will pass through the triple valve, which is in emergency position, to the auxiliary reservoir and out in this way. As a consequence, the engine brakes are released very quickly, due to the fact that the larger volume of air in the auxiliary reservoir is first drained out. This important result is accomplished without wasting any air from the main reservoir. This position of the valve is resorted to in case of the severe application of the brakes as by means of a burst hose, or even in emergency application of the brakes by the enigneer. In this position of the valve the engine brakes can be released so quickly in either of these contingencies that the cars will not bunch up on the engine sufficiently to buckle and be thrown from the track.

To prevent the valve being accidentally moved to emergency release position the section 60 of the notched quadrant is made so high that the spring detent 37 will not pass over the same. Behind the detent is a movable abutment 61, in the form of a pin or bolt lying in a notch in the detent and held normally in position by spring 62 to prevent the detent 37 from moving over section 60 of the quadrant. The abutment is provided with a notch 63 which when brought behind the detent will permit the latter to move back sufficiently far to pass the section 60 of the quadrant. By pressing on the head 64 of the abutment the latter can be moved to bring notch 63 behind the detent. In order, therefore, for the engineer to move the valve to emergency release position he must first press the abutment 61 inwardly and then operate handle 36.

If after an application of the engine and train brakes it is desired to release the engine brakes and hold the train brakes, the cock 14 in pipe 13 will be moved to connect the auxiliary reservoir to the atmosphere. This will at once reduce the pressure on the auxiliary reservoir side of the triple valve piston thus permitting the triple valve to move to release position.

A connection 65 is made between the supply pipe 15 and auxiliary reservoir pipe 13. In this connection is a check valve 66 seating toward the pipe 15. As a consequence the auxiliary reservoir will be charged automatically whenever its pressure falls below that in the pipe 15, but the check valve prevents auxiliary reservior pressure escaping to the pipe 15 when pressure is reduced in the latter. The connection 65 may, if desired, be made to the main train pipe 2 instead of to the engine train pipe 15.

The operation of the system will be clearly understood from the foregoing description. Suffice it to say, that the engineer's valve has all of the positions and performs all the functions of any existing engineer's valve now in use, and besides this, performs the important functions of controlling the engine brakes independently of the train brakes, both as to application and release, and the further important function of enabling the engine brakes to be quickly released in case of a burst hose or emergency application of the brakes.

What I claim is:

1. In an automatic air-brake system, the combination of an engine brake cylinder, triple valve, and auxiliary reservoir and connections between the same, a main reservoir, a train pipe, and an engineer's valve connected to the main reservoir and train pipe, and having an independent connection to the engine triple valve and arranged to connect the main reservoir either to the train pipe or to both the train pipe and the engine triple valve supply pipe.

2. In an automatic air-brake system, the combination of an engine brake cylinder, triple valve, and auxiliary reservoir and connections between the same, a main reservoir, a train pipe, and an engineer's valve connected to the main reservoir and train pipe, and to the engine auxiliary reservoir, and arranged to exhaust the auxiliary reservoir to the atmosphere independently of exhausting the train pipe to the atmosphere.

3. In an automatic air-brake system, the combination of an engine brake cylinder, triple valve and auxiliary reservoir and connections between the same, a main reservoir, a train pipe, and an engineer's valve connected to the main reservoir, the train pipe, and the engine auxiliary reservoir, and having an independent connection to the engine triple valve and arranged to connect the main reservoir either to the train pipe or to both the train pipe and the engine triple valve supply pipe, and to exhaust the engine auxiliary reservoir to the atmosphere independently of exhausting the train pipe to the atmosphere.

4. In an automatic air-brake system, the combination of an engine brake cylinder, triple valve, and auxiliary reservoir and connections between the same, a main reservoir, a train pipe, and an engineer's valve connected to the main reservoir, the train pipe, and the engine auxiliary reservoir, and arranged to exhaust the auxiliary reservoir to the atmosphere independently of exhausting the train pipe to the atmosphere, and a valve in the auxiliary reservoir connection arranged to connect said reservoir to the atmosphere independently of the engineer's valve.

5. In an automatic air-brake system, the combination of engine brake cylinder, triple valve, and auxiliary reservoir and connections between the same, a main reservoir, a train pipe, and an engineer's valve connected to the main reservoir and train pipe and having an independent connection to the engine triple valve, said engineer's valve being arranged to connect the main reservoir to the train pipe while holding the triple valve supply pipe closed.

6. In an automatic air-brake system, the combination of an engine brake cylinder, a triple valve, and an auxiliary reservoir and connections between the same, a main reservoir, a train pipe, and an engineer's valve connected to the main reservoir and train pipe and having an independent connection to the engine triple valve, said valve being arranged to connect the main reservoir to the train pipe while holding the triple valve supply pipe closed, or to connect the main reservoir to both the train pipe and the triple valve supply pipe.

7. In an automatic air-brake system, the combination of an engine brake cylinder, triple valve, and auxiliary reservoir and connections between the same, a main reservoir, a train pipe, an engineer's valve connected to the main reservoir and train pipe and having an independent connection to the engine triple valve, said valve being arranged to connect the main reservoir to the train pipe while holding the triple valve supply pipe closed, and an automatic exhaust valve in the triple valve supply pipe.

8. In an automatic air-brake system, the combination of an engine brake cylinder, triple valve and auxiliary reservoir and connections between the same, a main reservoir, a train pipe, an engineer's valve connected to the main reservoir and train pipe and having an independent connection to the engine triple valve and arranged to connect the main reservoir to both the train pipe and the engine triple valve supply pipe, or to cut the connection between the train pipe and triple valve supply pipe, and an automatic exhaust valve in said triple valve supply pipe.

9. In an automatic air-brake system, the combination of an engine brake cylinder, triple valve and auxiliary reservoir and connections between the same, a main reservoir, a train pipe, an engineer's valve connected to the main reservoir and train pipe and having an independent connection to the engine triple valve, a connection from the triple valve supply pipe to the auxiliary reservoir, and a check valve in said connection seating toward the train pipe.

10. In an automatic air-brake system, the combination of a main reservoir, engineer's valve, and train pipe, an engine brake cylinder, triple valve and auxiliary reservoir, and a valve located adjacent to the engineer's valve and arranged to connect the engine auxiliary reservoir to the atmosphere.

11. In an automatic air-brake system, an engineer's valve, an engine auxiliary reservoir connected to engineer's valve, ports in the engineer's valve arranged to connect the auxiliary reservoir to the atmosphere, and independently operative means to prevent the engineer's valve being accidentally moved to auxiliary reservoir release position.

In testimony whereof, I the said FRANK H. DUKESMITH have hereunto set my hand.

FRANK H. DUKESMITH.

Witnesses:
G. H. RANKIN,
F. W. WINTER.